United States Patent
Choi et al.

(10) Patent No.: US 10,732,927 B2
(45) Date of Patent: Aug. 4, 2020

(54) ELECTRONIC DEVICE AND CONTROL METHOD THEREOF

(71) Applicant: SAMSUNG ELECTRONICS CO., LTD., Suwon-si, Gyeonggi-do (KR)

(72) Inventors: Eunseok Choi, Suwon-si (KR); Kunsok Kang, Suwon-si (KR); Youngkwang Seo, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/539,207

(22) Filed: Aug. 13, 2019

(65) Prior Publication Data

US 2020/0117418 A1 Apr. 16, 2020

(30) Foreign Application Priority Data

Oct. 12, 2018 (KR) .......................... 10-2018-0121969

(51) Int. Cl.
*H04R 29/00* (2006.01)
*G06F 3/16* (2006.01)
(Continued)

(52) U.S. Cl.
CPC .............. *G06F 3/165* (2013.01); *G10L 25/51* (2013.01); *H04R 29/001* (2013.01); *H04R 2430/01* (2013.01)

(58) Field of Classification Search
CPC ........ H04R 29/00; H04R 29/001; H04R 3/00; H04R 3/04; H04R 3/12; H04R 2430/01;
(Continued)

(56) References Cited

U.S. PATENT DOCUMENTS 7,020,894 B1  3/2006  Godwin et al.
7,996,750 B2  8/2011  Wang et al.
(Continued)

FOREIGN PATENT DOCUMENTS

JP           3693393          9/2005
KR   10-2010-0060717          6/2010
(Continued)

OTHER PUBLICATIONS

International Search Report and Written Opinion dated Nov. 25, 2019 in counterpart International Application No. PCT/KR2019/010350.

*Primary Examiner* — Thang V Tran
(74) *Attorney, Agent, or Firm* — Nixon & Vanderhye, P.C.

(57) ABSTRACT

An electronic device is provided. The electronic device includes a communicator comprising communication circuitry; a speaker; and a processor configured to control the electronic device to: output a first sound via the speaker and control the communicator to transmit a control signal to output a second sound to an external sound output device, receive from an external remote control a first recorded signal obtained by recording the first sound output via the speaker and the second sound output via the external sound output device, obtain information for adjusting output volume of at least one of the speaker or the external sound output device based on the first recorded signal, control the speaker to output a first test sound and the communicator to transmit a control signal to output a second test sound to the external sound output device based on the obtained information, receive from the external remote control a second recorded signal obtained by recording the first test sound output via the speaker and the second test sound output via the external sound output device, and identify an output (Continued)

delay time of the external sound output device based on the second recorded signal.

20 Claims, 16 Drawing Sheets

(51) Int. Cl.
*H04S 7/00* (2006.01)
*H04R 3/00* (2006.01)
*G10L 25/51* (2013.01)

(58) Field of Classification Search
CPC ... G06F 3/16; G06F 3/165; H04S 7/30; H04S 7/301; H04S 7/307; H04S 2400/13; H04S 2400/15; G10L 25/51
See application file for complete search history.

(56) References Cited

U.S. PATENT DOCUMENTS

| | | | |
|---|---|---|---|
| 9,565,426 B2 | 2/2017 | Yang et al. | |
| 9,578,210 B2 | 2/2017 | Lee et al. | |
| 9,942,684 B2 | 4/2018 | Cheon et al. | |
| 2009/0161879 A1* | 6/2009 | Yanagawa | H04R 5/04 381/17 |
| 2009/0232318 A1* | 9/2009 | Ohta | H04R 29/001 381/56 |
| 2009/0290064 A1 | 11/2009 | Matsumoto et al. | |
| 2009/0323980 A1* | 12/2009 | Wu | H04R 3/005 381/92 |
| 2012/0172118 A1* | 7/2012 | Shimamura | H04R 3/04 463/31 |
| 2013/0315405 A1* | 11/2013 | Kanishima | H04R 29/00 381/58 |
| 2014/0294201 A1 | 10/2014 | Johnson et al. | |
| 2015/0016642 A1* | 1/2015 | Walsh | H04S 7/301 381/307 |
| 2015/0077633 A1 | 3/2015 | Lee et al. | |
| 2017/0245087 A1* | 8/2017 | Baba | H04R 5/02 |
| 2017/0257722 A1* | 9/2017 | Kerdranvat | H04S 3/002 |
| 2017/0288625 A1* | 10/2017 | Kim | H04R 29/001 |
| 2018/0146156 A1* | 5/2018 | Lee | H04N 5/60 |
| 2019/0306642 A1* | 10/2019 | Ayotte | H04S 7/303 |
| 2020/0029162 A1* | 1/2020 | Matsunaga | G10L 21/0264 |
| 2020/0092646 A1* | 3/2020 | Yamamoto | H04R 29/001 |

FOREIGN PATENT DOCUMENTS

| | | |
|---|---|---|
| KR | 10-2012-0074700 | 7/2012 |
| KR | 10-2013-0087678 | 8/2013 |
| KR | 10-2015-0030946 | 3/2015 |
| KR | 10-2016-0138726 | 12/2016 |

* cited by examiner

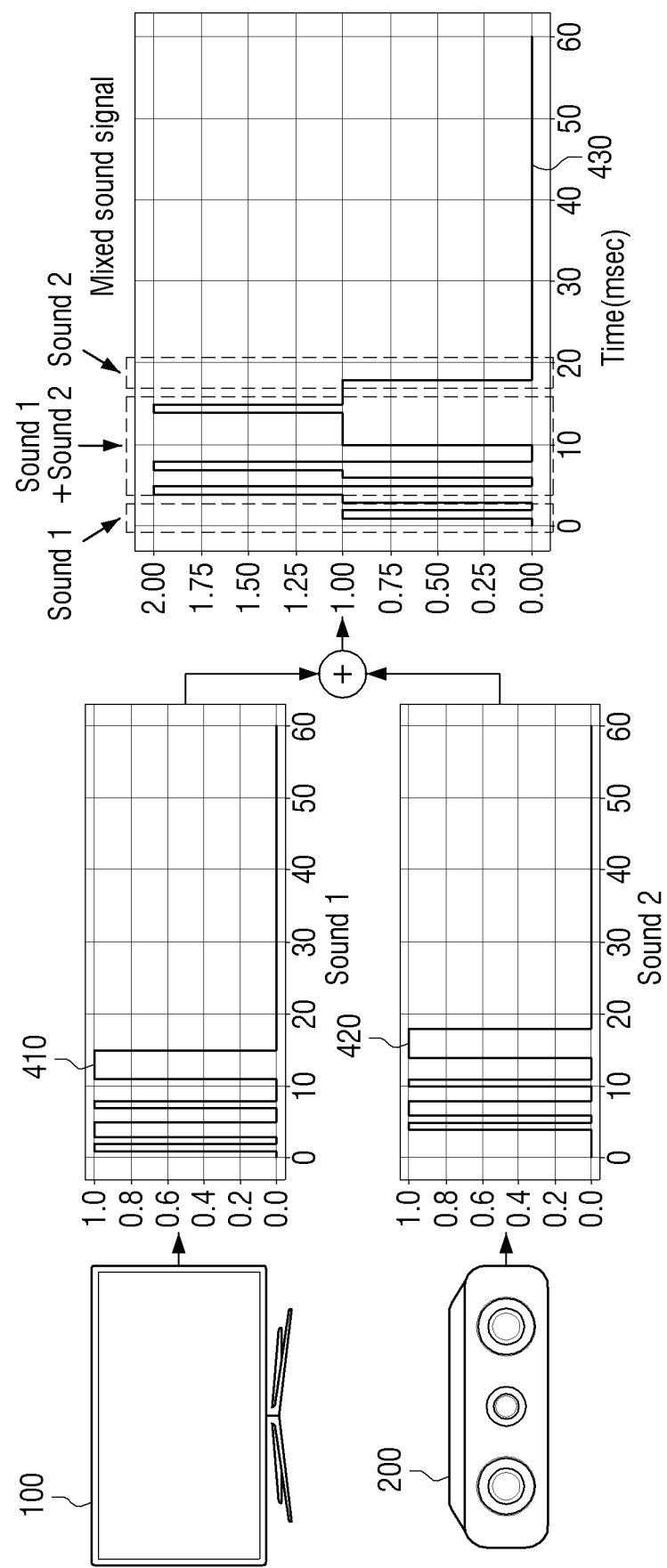

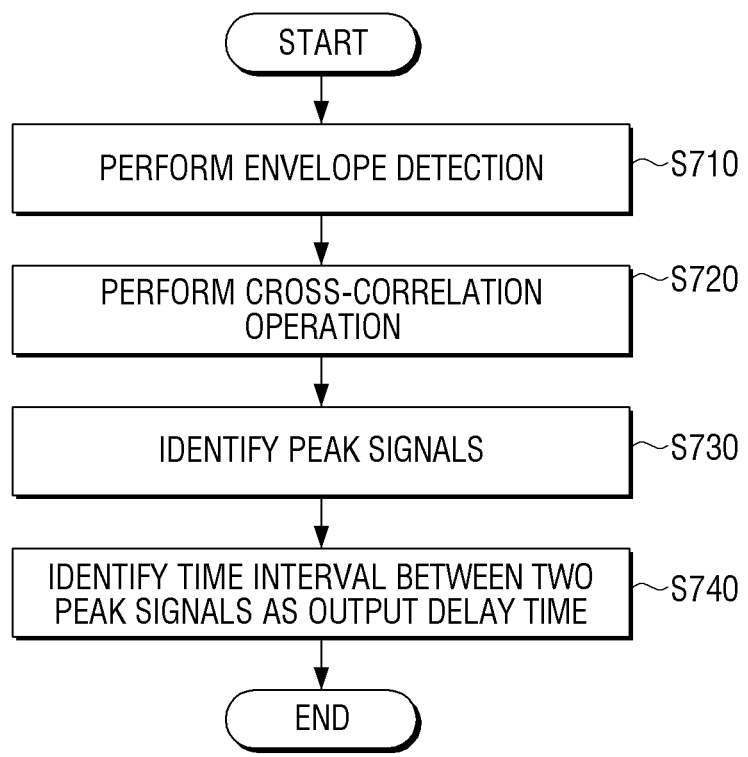

ELECTRONIC DEVICE AND CONTROL METHOD THEREOF

CROSS-REFERENCE TO RELATED APPLICATIONS

This application is based on and claims priority under 35 U.S.C. § 119 to Korean Patent Application No. 10-2018-0121969, filed on Oct. 12, 2018, in the Korean Intellectual Property Office, the disclosure of which is incorporated by reference herein in its entirety.

BACKGROUND

Field

The disclosure relates to an electronic device for synchronizing sound of an external sound output device, and a control method thereof.

Description of Related Art

With the development of electronic technology, various types of electronic devices are being developed and supplied. In particular, an external sound output device such as a sound bar is often used to output sound of an electronic device.

When the sound of the electronic device is output via the external sound output device, there is a problem that the sound of the electronic device and sound output via the external sound output device may not be identical to each other.

For example, generally, there is no problem in synchronization between an image and sound output from a display device, but the image may not be synchronized with the sound when the sound of the display device is output via an external sound output device, thereby interrupting a user's immersion in watching the image.

In this case, in the past, an image or sound output from an electronic device has been manually synchronized by a user with sound output via an external sound output device. However, synchronization accuracy may be low and inconvenience may be caused to the user, when the image or sound output from the electronic device is synchronized by the user with the sound output via the external sound output device.

Accordingly, there is a need for a method of synchronizing sound of an electronic device with sound output via an external sound output device by automatically measuring a delay time between the electronic device and the external sound output device.

In addition, there is a problem that synchronization is difficult to perform when an intensity of test sound output to measure a delay time of the external sound output device is extremely low or high.

SUMMARY

Various example of the disclosure address the above disadvantages and other disadvantages not described above.

The disclosure provides an electronic device capable of synchronizing a point of time at which sound or an image is to be output from an electronic device with a point of time at which the sound is to be output via an external sound output device by adjusting an intensity of test sound and receiving a recorded signal obtained by recording, via a remote control with a microphone, the sound output via a speaker included in the electronic device and the test sound output via an external sound output device, and a control method thereof.

According to an example embodiment of the disclosure, an electronic device includes a communicator comprising communication circuitry; a speaker; and a processor configured to control the electronic device to: output a first sound via the speaker and control the communicator to transmit a control signal to output a second sound to an external sound output device, receive, from an external remote control, a first recorded signal obtained by recording the first sound output via the speaker and the second sound output via the external sound output device, obtain information for adjusting output volume of at least one of the speaker or the external sound output device based on the first recorded signal, control the speaker to output a first test sound and the communicator to transmit a control signal to output a second test sound to the external sound output device based on the obtained information, receive from the external remote control a second recorded signal obtained by recording the first test sound output via the speaker and the second test sound output via the external sound output device, and identify an output delay time of the external sound output device based on the second recorded signal.

The processor may control the communicator to transmit the information for adjusting the output volume of the external sound output device to the external sound output device, together with the control signal for outputting the second test sound.

The processor may identify the first sound, the second sound, and noise sound contained in the first recorded signal, and obtain the information for adjusting the output volume of at least one of the speaker or the external sound output device, based on information regarding intensities of the first sound, the second sound, and the noise sound.

The first test sound may include a sound of a first carrier frequency, the sound including a pseudo random noise (PN) code, and the second test sound may include a sound of a second carrier frequency, the sound including the PN code.

The second carrier frequency may be different from the first carrier frequency.

The processor may identify a first correlation between the second recorded signal and the sound of the first carrier frequency and a second correlation between the second recorded signal and the sound of the second carrier frequency, and identify the output delay time based on a difference between a point of time at which a first peak signal is generated based on the first correlation and a point of time at which a second peak signal is generated based on the second correlation.

The processor may identify the first correlation by performing a cross-correlation operation on the second recorded signal and the PN code included in the sound of the first carrier frequency, and identify the second correlation by performing the cross-correlation operation on the second recorded signal and the PN code included in the sound of the second carrier frequency.

Each of the sound of the first carrier frequency and the second carrier frequency may include sound in which one section including a section including the PN code and a section not including the PN code is periodically repeated.

The first test sound may include sound of a first frequency, and the second test sound may include sound of a second frequency different from the first frequency.

The processor may identify the output delay time based on a difference between a point of time at which the first frequency is identified and a point of time at which the second frequency is identified.

The first sound and the second sound may not include the first test sound and the second test sound, respectively.

The processor may synchronize a point of time at which sound is to be output via the speaker and a point of time at which sound is to be output via the sound output device with each other, based on the output delay time.

In a sound synchronization mode, the processor may control the speaker to output the first test sound and transmit the control signal to output the second test sound to the external sound output device.

The processor may enter the sound synchronization mode based on at least one of an event for connecting the external sound output device to the electronic device, an event for changing a content provider providing content to the electronic device, or an event for pressing a predetermined button of the external remote control occurring.

According to another example embodiment of the disclosure, a method of controlling an electronic device includes outputting a first sound via a speaker and transmitting a control signal to output a second sound to an external sound output device; receiving, from an external remote control, a first recorded signal obtained by recording the first sound output via the speaker and the second sound output via the external sound output device, and obtaining information for adjusting output volume of at least one of the speaker or the external sound output device based on the first recorded signal; outputting a first test sound via the speaker and transmitting a control signal to output a second test sound to the external sound output device based on the obtained information; and receiving from the external remote control a second recorded signal obtained by recording the first test sound output via the speaker and the second test sound output via the sound output, and identifying an output delay time of the external sound output device based on the second recorded signal.

The transmitting of the control signal to output the second test sound to the external sound output device may include transmitting the information for adjusting the output volume of the external sound output device to the external sound output device, together with the control signal to output the second test sound.

The obtaining of the information may include identifying the first sound, the second sound, and a noise sound contained in the first recorded signal, and obtaining the information for adjusting the output volume of at least one of the speaker or the external sound output device based on information regarding intensities of the first sound, the second sound, and the noise sound.

The first test sound may include a sound of a first carrier frequency, the sound including pseudo random noise (PN) code, and the second test sound may include a sound of a second carrier frequency, the sound including the PN code.

The second carrier frequency may be different from the first carrier frequency.

The identifying of the output delay may include identifying a first correlation between the second recorded signal and the sound of the first carrier frequency and a second correlation between the second recorded signal and the sound of the second carrier frequency; and identifying the output delay time, based on a difference between a point of time at which a first peak signal is generated based on the first correlation and a point of time at which a second peak signal is generated based on the second correlation.

The identifying of the output delay may include identifying the first correlation by performing a cross-correlation operation on the second recorded signal and the PN code included in the sound of the first carrier frequency, and identifying the second correlation by performing the cross-correlation operation on the second recorded signal and the PN code included in the sound of the second carrier frequency.

As described above, according to various example embodiments of the disclosure, a point of time at which sound is to be output from an electronic device and a point of time at which sound is to be output from an external sound device may be synchronized with each other without a user's manipulation, thereby improving user convenience.

BRIEF DESCRIPTION OF THE DRAWINGS

The above and/or other aspects, features and advantages of certain embodiments of the disclosure will be more apparent from the following detailed description, taken in conjunction with the accompanying drawings, in which:

FIG. 4 is a diagram illustrating example sound output from an electronic device and sound output from a sound output device, according to an embodiment of the disclosure;

FIG. 7 is a flowchart illustrating an example process of identifying an output delay time at which a PN code of test sound is modulated into a carrier frequency, according to an embodiment of the disclosure;

DETAILED DESCRIPTION

Figure 1:
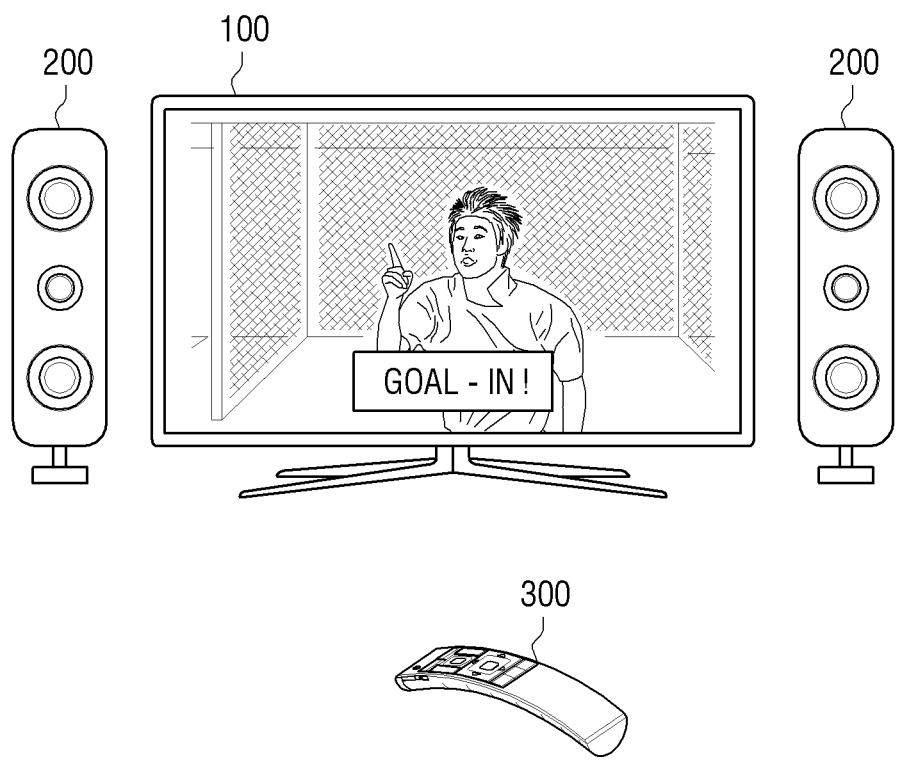
FIG. 1 is a diagram illustrating an example electronic system, according to an embodiment of the disclosure.

Hereinafter, the disclosure will be described in greater detail with reference to the accompanying drawings.

The terms used herein will be briefly described and the disclosure will be described in detail below.

In the example embodiments of the disclosure, general terms that have been widely used nowadays are selected, if possible, in consideration of functions of the disclosure, but non-general terms may be selected according to the intentions of technicians in this art, precedents, or new technologies, etc. Some terms may be arbitrarily chosen. In this case, the meanings of these terms will be explained in corresponding parts of the disclosure. Accordingly, the terms used herein should be defined not based on the names thereof but based on the meanings thereof and the entire context of the disclosure.

Various modifications may be made in embodiments of the disclosure and various embodiments may be implemented. Thus, embodiments are illustrated in the drawings and described in detail in the detailed description. However, it should be understood that the scope of the disclosure is not limited to particular embodiments and all modifications, equivalents, and alternatives falling within the idea and scope of the disclosure are to be included in the scope of the disclosure. In the following description of the embodiments of the disclosure, related art may not be described in detail if it is determined that it may obscure the disclosure with unnecessary detail.

As used herein, the singular expressions are intended to include plural forms as well, unless the context clearly dictates otherwise. It will be further understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

It should be understood that the expression "at least one of A and/or B" indicates "A", "B" or one of "A and B".

As used herein, the terms "first," "second," and the like may be used to describe various elements regardless of order and/or importance and distinguish one element from another element, but these elements should not be limited by these terms.

When an element (e.g., a first element) is referred to as being "operatively or communicatively coupled with/to" or "connected to" another element (e.g., a second element), the element should be understood as being directly connected to the other element or connected to the other element via another element (e.g., a third element).

In the disclosure, the term "module" or "unit" may refer to an element performing at least one function or operation, and may be embodied as hardware, software, or a combination thereof. A plurality of "modules" or a plurality of "units" may be integrated into at least one module to form at least one processor (not shown), except a "module" or "unit" which need be embodied as particular hardware. As used herein, the term "user" may refer to a person or a device (e.g., an artificial intelligence electronic device) capable of using an electronic device.

Example embodiments of the disclosure will be described in greater detail below with reference to the accompanying drawings so that they may be easily understood by those of ordinary skill in the art. However, the disclosure may be embodied in many different forms and is not limited to the embodiments set forth herein. For clarity, parts not related to explaining the disclosure may be omitted in the drawings, and like components are denoted by like reference numerals throughout the specification.

Example embodiments of the disclosure will now be described in greater detail below with reference to the accompanying drawings.

FIG. 1 is a diagram illustrating an electronic system according to an embodiment of the disclosure.

An electronic system 1000 includes an electronic device 100, a sound output device 200, and a remote control 300.

According to an example embodiment of the disclosure, the electronic device 100 may, for example, be embodied as a display device capable of outputting an image, and transmitting at least a portion of sound synchronized with the image to the sound output device 200 to be output via the sound output device 200. For example, the electronic device 100 may output an image and then output sound synchronized with the image to the sound output device 200 and/or output sound of at least some channels among multi-channel sound synchronized with the image via a speaker included therein and transmit sound of the remaining channels to the sound output device 200 to be output via the sound output device 200.

In this example, a point of time at which the image and sound output from the electronic device 100 are output may not be the same as a point of time at which the sound synchronized with the image is output via the sound output device 200. This may occur because a delay time may occur during transmission of a sound signal from the electronic device 100 to the sound output device 200.

In an example embodiment, when the electronic device 100 is embodied as a master speaker of a multi-channel speaker system, a delay time may also occur during transmission of sound of some channels from the electronic device 100 to a slave speaker. For ease of explanation, it will be hereinafter assumed that the electronic device 100 is embodied as a display device. However, it will be understood that the disclosure is not limited thereto.

In order to address this problem, according to an embodiment of the disclosure, the electronic device 100 may control a test sound to be output while the test sound is transmitted to the sound output device 200 to be output via the sound output device 200, so that an output delay time during the transmission of the test sound to the sound output device 200 may be identified in order to synchronize a point of time at which an image and sound are to be output from the electronic device 100 with a point of time at which the sound is to be output from the sound output device 200, based on the output delay time.

In the above example, the remote control 300 may record the test sound output from the electronic device 100 and the sound output device 200 and transmit the recorded sound to the electronic device 100. In this example, the electronic device 100 may identify a delay time occurring during the transmission of the test sound to the sound output device 200 based on the recorded sound.

Not only the test sound but also ambient noise may be recorded in the recorded sound and thus may affect the measurement of a delay time. For example, when an intensity of the test sound is extremely higher or lower than that of the ambient noise, the test sound may not be easy to identify from the recorded sound. Accordingly, it may be necessary to appropriately adjust the intensity of the test sound. Various example embodiments of the disclosure will be described in greater detail below with reference to the drawings.

It will be hereinafter assumed that sound output from the electronic device 100 is synchronized with an image displayed on the electronic device 100.

Figure 2A:
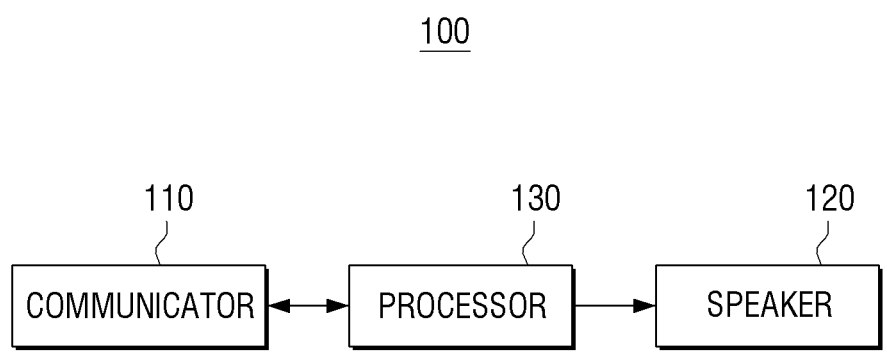
FIGS. 2A and 2B are block diagrams illustrating example electronic devices, according to embodiments of the disclosure.
Figure 2B:
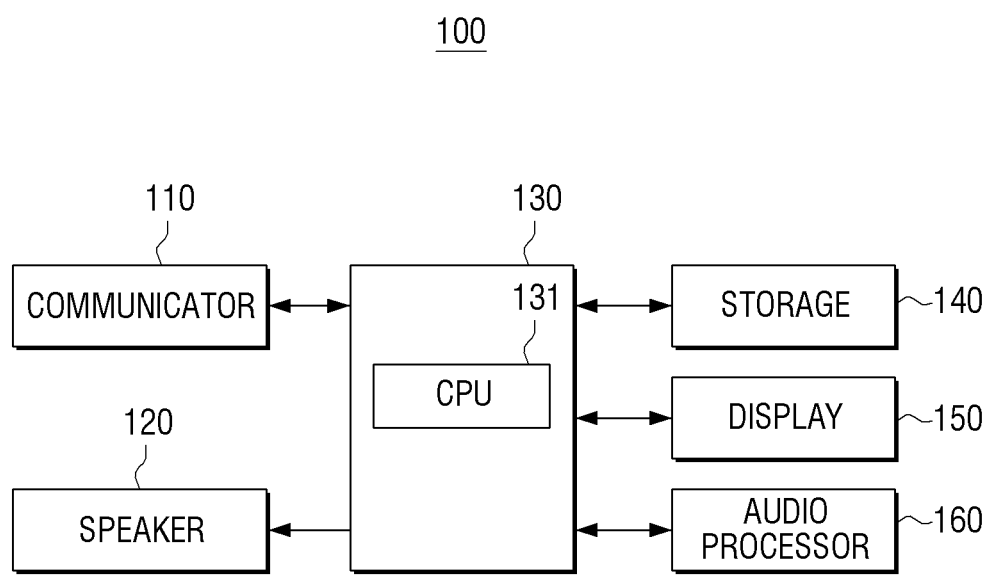

FIGS. 2A and 2B are block diagrams illustrating example electronic devices according to embodiments of the disclosure.

Referring to FIG. 2A, an electronic device 100 may include a communicator (e.g., including communication circuitry) 110, a speaker 120, and a processor (e.g., including processing circuitry) 130.

The communicator 110 may include various communication circuitry and communicates with an external sound output device 200 and a remote control 300. For example, the communicator 110 may establish wired or wireless communication, and establish communication by various communication methods implemented using various communication circuitry, such as an infrared (IR) communication method, wireless fidelity (WI-FI), ZigBee, beacon, near-field communication (NFC), WAN, Ethernet, IEEE 1394, HDMI, USB, MHL, AES/EBU, an optical communication method, and a coaxial communication method. However, it will be understood that the disclosure is not limited thereto.

For example, the communicator 110 may transmit a control signal for outputting sound to the external sound output device 200 under control of the processor 130. The communicator 110 may also receive a recorded signal transmitted from the remote control 300.

The speaker 120 may output sound. For example, the speaker 120 may be embodied as a built-in speaker but may include a wired speaker. However, it will be understood that the disclosure is not limited thereto.

The processor 130 may include various processing circuitry and controls overall operations of the electronic device 100.

In an example embodiment of the disclosure, the processor 130 may be include, for example, and without limitation, one or more of a digital signal processor (DSP), a microprocessor, a time controller (TCON), or the like, that processes digital signals. However, the processor 130 is not limited thereto, and may include or be referred to, for example, and without limitation, as at least one of a central processing unit (CPU), a micro-controller unit (MCU), a micro-processing unit (MPU), a controller, an application processor (AP), a communication processor (CP), an ARM processor, or the like. The processor 130 may be embodied as a system-on-chip (SoC) storing a processing algorithm, a large-scale integration (LSI), a field programmable gate array (FPGA), or the like.

According to an embodiment of the disclosure, the processor 130 may control the electronic device 100 to output first sound via the speaker 120, and control the communicator 110 to transmit a control signal for outputting second sound to the sound output device 200. The processor 130 may receive, via the remote control 300, a first recorded signal obtained by recording the first sound output via the speaker 120 and the second sound output via the sound output device 200, and obtain information for adjusting output volume of at least one of the speaker 120 or the sound output device 200, based on the first recorded signal.

For example, the first sound and the second sound may be types of a test sound which are output to obtain information regarding the output volumes of the speaker 120 and the sound output device 200. The first sound and the second sound may be the same or different. In an example embodiment, the first sound may be a sound not including the first test sound, and the second sound may be a sound not including the second test sound. In another embodiment, the processor 130 may obtain the information regarding the output volumes of the speaker 120 and the sound output device 200 by outputting the first test sound and the second test sound without additionally outputting the first sound and the second sound.

As will be described below, sound synchronization may be easily performed by adjusting output volume of the test sound for sound synchronization and outputting the test sound, based on the obtained information regarding the output volume. This is due to the test sound for sound synchronization being clearly identifiable from ambient noise sound contained in a second recording signal.

For example, the processor 130 may identify the first sound, the second sound, and the noise sound contained in the first recorded signal, and obtain the information for adjusting the output volume of at least one of the speaker 120 and/or the sound output device 200, based on information regarding intensities of the first sound, the second sound, and the noise sound. For example, an embodiment in which the first sound and the second sound contained in the first recorded signal are identified may be the same as an embodiment to be described below, in which first test sound and second test sound contained in the second recorded signal are identified.

For example, the processor 130 may identify predetermined first output volume to be applied to the first test sound and predetermined second output volume to be applied to the second test sound, based on the information regarding the intensities of the first sound, the second sound, and the noise sound contained in the first recorded signal. For example, the first output volume and the second output volume may be the same or different.

The processor 130 may control the speaker 120 to output the first test sound and the communicator 110 to transmit the control signal for outputting the second test sound to the sound output device 200, based on the information for adjusting the output volume, receive via the remote control 300 the second recorded signal obtained by recording the first test sound output via the speaker 120 and the second test sound output via the sound output device 200, and identify an output delay time of the sound output device 200, based on the second recorded signal. The processor 130 may control the communicator 110 to transmit the information for adjusting the output volume of the sound output device 200 to the sound output device 200, together with the control signal for outputting the second test sound.

For example, the processor 130 may transmit to the sound output device 200 a control signal for outputting the second test sound at the first output volume and the second test sound at the second output volume.

For example, the first test sound and the second test sound may be test sounds for synchronizing sound output from the speaker 120 and sound output from the sound output device 200, and may be the same or different.

However, when the first test sound and the second test sound are not identified from the second recorded signal, the processor 130 may output the first sound and the second sound again to obtain information regarding new output volume and adjust the output volumes of the first test sound and the second test sound, based on the obtained information.

In an example embodiment of the disclosure, the first test sound may be a sound of a first carrier frequency, the sound including pseudo random noise (PN) code, and the second test sound may be a sound of a second carrier frequency, the sound including PN code. For example, the PN code may be a logic signal in which 0 and 1 are randomly repeated and is encryption code known only to a transmitter and a receiver. For example, a 15-bit PN code such as

[010110010001111] may be used but is merely an example, and the disclosure is not limited thereto. The processor 130 may randomly generate PN code or obtain PN code previously stored in a storage (not shown).

The first carrier frequency and the second carrier frequency may be different carrier frequencies. Because the first test sound and the second test sound correspond to different carrier frequencies, correlation analysis may be easily performed as described later.

For example, the first test sound may be sound obtained by modulating the PN code into the first carrier frequency, and the second test sound may be sound obtained by modulating the PN code into the second carrier frequency. For example, each of the sound of the first carrier frequency and the sound of the second carrier frequency may be sound in which one section including a period including the PN code and a period not including the PN code is periodically repeated. The PN code included in the sound of the first carrier frequency and the PN code included in the sound of the second carrier frequency may be the same code.

In another embodiment, the first test sound and the second test sound may have different frequencies. For example, the first test sound may be sound of a first frequency, and the second test sound may be sound of a second frequency different from the first frequency.

In an example embodiment of the disclosure, the processor 130 may obtain a first correlation between the second recorded signal and the sound of the first carrier frequency and a second correlation between the second recorded signal and the sound of the second carrier frequency. Thereafter, the processor 130 may identify an output delay time of the sound output device 200, based on the difference between a point of time at which a first peak signal is generated based on the first correlation and a point of time at which a second peak signal is generated based on the second correlation.

For example, the processor 130 may identify the point of time at which the first peak signal is generated and the point of time at which the second peak signal is generated by performing a cross-correlation operation on the second recorded signal and the PN code contained in the sound of the first carrier frequency to identify the first correlation, and performing the cross-correlation operation on the second recorded signal and the PN code contained in the sound of the second carrier frequency to identify the second correlation.

The output delay time of the sound output device 200 may be identified based on the difference between the point of time at which the first peak signal is identified and the point of time at which the second peak signal is identified. A process of performing the cross-correlation operation will be described in greater detail below with reference to FIGS. 6A and 6B.

In another embodiment, the processor 130 may identify the output delay time based on the difference between a point of time at which the first frequency is identified from the second recorded signal and a point of time at which the second frequency is identified from the second recorded signal.

For example, the second recorded signal may contain various types of sound such as noise sound, as well as the first test sound and the second test sound. However, only the first test sound of the first frequency and the second test sound of the second frequency may be identified when a frequency analysis is performed to convert the sound contained in the second recorded signal into a frequency domain and perform filtering. The processor 130 may identify the output delay time through the frequency analysis based on the difference between the point of time at which the first test sound is identified and the point of time at which the second test sound is identified.

For example, the frequency analysis may be performed by a well-known method such as, for example, and without limitation, Fast Fourier Transform (FFT) or the like, but is not limited thereto.

The processor 130 may synchronize a point of time at which sound is to be output via the speaker 120 of the electronic device 100 and a point of time at which sound is to be output via the sound output device 200 with each other, based on the output delay time. For example, the processor 130 may delay the point of time at which an image and sound are to be output from the electronic device 100 by the output delay time.

In addition, in a sound synchronization mode, the processor 130 may control the speaker 120 to output the first test sound and transmit a control signal for outputting the second test sound to the sound output device 200. For example, the processor 130 may enter the sound synchronization mode when at least one of an event for connecting the sound output device 200 to the electronic device 100, an event for changing a content provider providing content to the electronic device 100, and/or an event for pressing a predetermined button of an external remote control occurs. For example, when a content provider is changed from a method of displaying an image on the electronic device 100 based on information received from a set-top box to a method of displaying the image on the electronic device 100 based on information received via a USB, the processor 130 may enter the sound synchronization mode, control the speaker 120 to output the first test sound, and transmit the control signal for outputting the second test sound to the sound output device 200.

Accordingly, the processor 130 may synchronize the point of time at which sound is to be output via the speaker 120 and the point of time at which the sound is to be output via the sound output device 200 with each other, based on the identified output delay time. Various embodiments of the disclosure will be described in greater detail below with reference to the drawings.

FIG. 2B is a block diagram illustrating an example structure of an electronic device.

Referring to FIG. 2B, an electronic device 100 may further include a storage 140, a display 150, and an audio processor (e.g., including audio processing circuitry) 160, as well as a communicator (e.g., including communication circuitry) 110, a speaker 120, and a processor (e.g., including processing circuitry) 130.

The storage 140 may, for example, include a memory and stores various types of data necessary to operate the electronic device 100.

The storage 140 may, for example, be embodied as an internal memory of the processor 130, e.g., a read-only memory (ROM) or a random access memory (RAM), a memory separated from the processor 130, or the like, but is not limited thereto. In this example, the storage 140 may be embodied as a memory embedded in the electronic device 100 or a memory detachable from the electronic device 100 according to a purpose of storing data. The memory embedded in the electronic device 100 may be embodied in the form of a nonvolatile memory, a volatile memory, a hard disk drive (HDD), a solid-state drive (SSD), or the like, but is not limited thereto.

The storage 140 may store a PN code.

The processor 130 may include various processing circuitry, such as, for example, and without limitation, a CPU 131, a ROM (or a nonvolatile memory) storing a control program for control of the electronic device 100, and a RAM (or a volatile memory) configured to store data input from the outside of the electronic device 100 or to be used as a storage region corresponding to various works performed by the electronic device 100.

The processor 130 may execute an operating system (OS), a program, and various applications stored in the storage 140 when a predetermined event occurs. The processor may include a single core, dual cores, triple cores, quad cores, or multiple cores.

The CPU 131 may access the storage 140 and perform booting using the OS stored in the storage 140. Various operations are performed using various programs, content, data, and the like stored in the storage 140 and an external interface.

The display 150 may provide various types of content. In an example embodiment of the disclosure, the electronic device 100 may be embodied as a display device such as, for example, and without limitation, a TV, a large-format display (LFD), a digital signage, a digital information display (DID), a video wall, or the like. However, the electronic device 100 is not limited thereto.

In this example, the display 150 may be embodied in various forms, such as, for example, and without limitation, a liquid crystal display (LCD), an organic light-emitting diode (OLED), a liquid crystal-on-silicon (LCoS), a digital light processor (DLP), a quantum dot (QD) display panel, or the like.

Although the electronic device 100 has been described as being embodied a display device in the above-described example, the electronic device 100 may be embodied a device, such as, for example, and without limitation, a set-top box a desktop computer, or the like, for providing a video signal to an external device.

For example, a set-top box may communicate with a display device by wire, and communicate with the sound output device 200 wirelessly. In this example, a delay time occurring during transmission of a sound signal from the set-top box to the sound output device 200 may be longer than that occurring during transmission of the image signal from the set-top box to the display device.

In this example, the set-top box may transmit a control signal for outputting a first test sound to the display device and transmit a control signal for outputting a second test sound to the sound output device 200. An example process of identifying an output delay time may be implemented in various embodiments as described above and thus will not be repeated here.

The audio processor 160 may include various audio processing circuitry and may be configured to perform an operation related to outputting sound from the electronic device 100. The audio processor 160 may output various types of sound via the speaker 120 included in the electronic device 100, and transmit a control signal for outputting the various types of sound to the sound output device 200 via the communicator 110. Furthermore, the audio processor 160 may adjust an output volume of sound output through the speaker 120 and a sound output volume signal included in the control signal transmitted to the sound output device 200.

For example, the audio processor 160 may perform overall operations of the electronic device 100 related to outputting sound, and may be embodied as part of the processor 130 or a component (or a chip) separated from the processor 130. For example, in an example embodiment of the disclosure, an operation performed by the audio processor 160 may be performed by the processor 130 or a chip separated from the processor 130. Operations related to the audio processor 160 will be described in greater detail below with reference to FIG. 13.

Figure 3A:
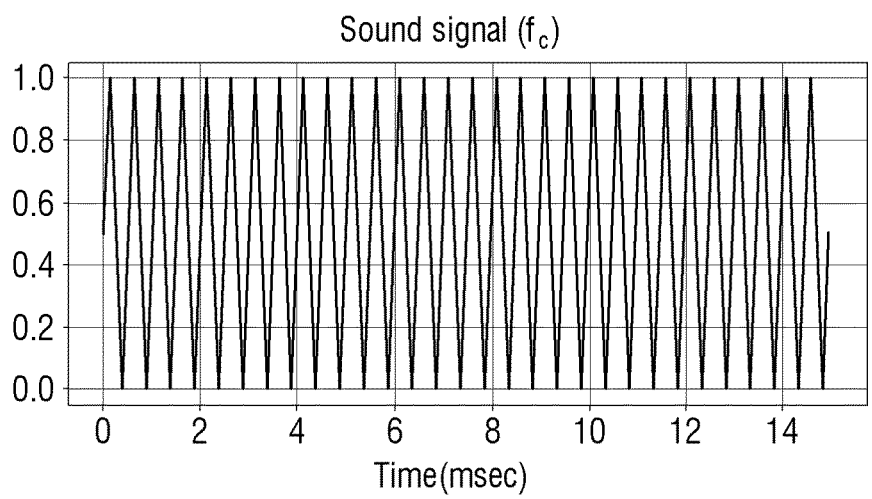
FIGS. 3A, 3B and 3C are diagrams illustrating an example in which test sound is sound obtained by modulating PN code into a carrier frequency, according to embodiments of the disclosure.
Figure 3B:
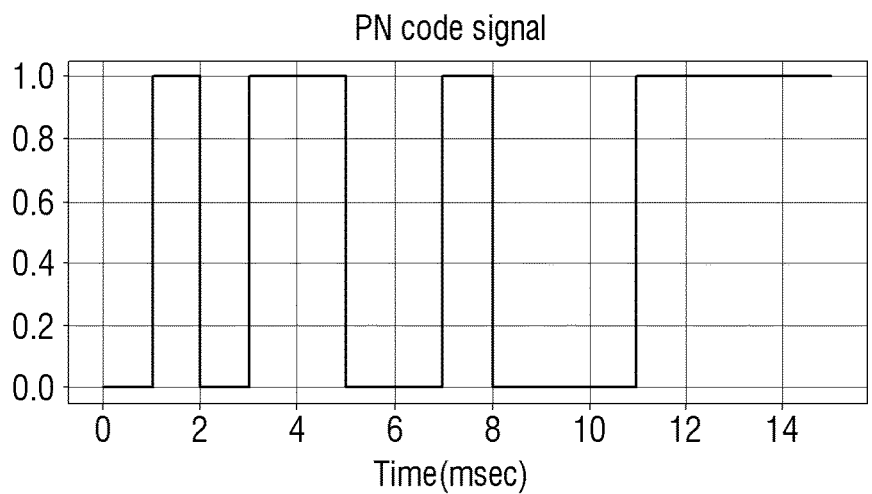
Figure 3C:
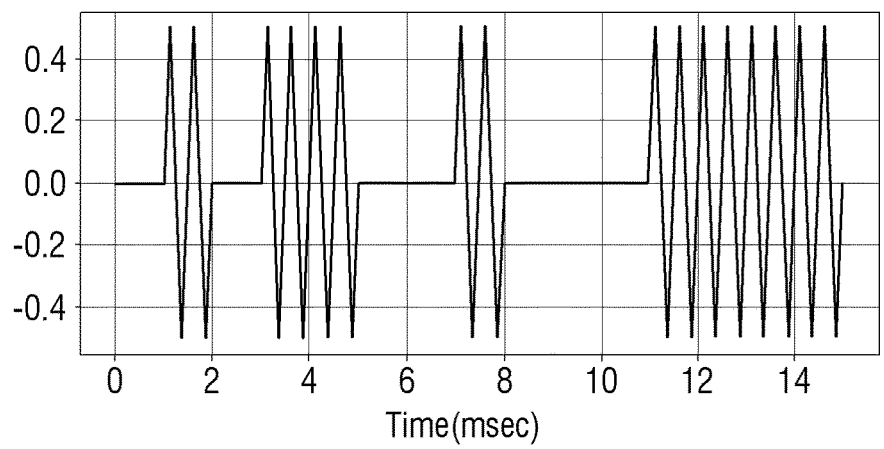

FIGS. 3A, 3B and 3C are diagrams illustrating an example in which a test sound is sound obtained by modulating a PN code into a carrier frequency.

The processor 130 may output sound, the PN code of which is modulated into a first carrier frequency, via the speaker 120, and transmits a control signal for outputting sound, the PN code of which is modulated into a second carrier frequency, to the sound output device 200.

The term "carrier frequency" may refer, for example, to a frequency for modulating the PN code to transmit the PN code as illustrated in FIG. 3A. As an example, the carrier frequency may be a frequency in an audio frequency range of 20 Hz to 20 kHz but may be a frequency in a non-audio frequency range. For example, the first carrier frequency may be 17 kHz and the second carrier frequency may be 19 kHz.

The PN code may be a logic signal in which 0 and 1 are randomly repeated, for example, as illustrated in FIG. 3B. As one example, the processor 130 may randomly generate PN code, such as [010110010001111]. As another example, the processor 130 may obtain PN code stored in the storage 140.

The processor 130 may store the randomly generated or obtained PN code in the storage 140. This is because when a recorded signal is received from the remote control 300, it may be necessary for the processor 130 to check whether the generated PN code is identical to PN code included in the recorded signal.

Thereafter, referring to FIG. 3C, the processor 130 may obtain test sound by modulating the PN code into a carrier frequency. For example, the processor 130 may obtain first test sound by modulating the PN code into a first carrier frequency and obtain second test sound by modulating the PN code into a second carrier frequency. Various well-known modulation methods may be used to modulate the PN code into a carrier frequency.

In an example embodiment of the disclosure, sound modulated into a carrier frequency may be sound in which one section including a period including the PN code and a period not including the PN code is periodically repeated. For example, in sound having a period of 60 msec, the PN code may be included in a section of the sound from 0 msec to 15 msec and may not be included in a section of the sound from 15 msec to 60 msec.

FIG. 4 is a diagram illustrating an example sound output from an electronic device and an example sound output from a sound output device, according to an embodiment of the disclosure.

According to an example embodiment of the disclosure, first sound 410 illustrated in FIG. 4 represents PN code output from an electronic device 100, and second sound 420 illustrated in FIG. 4 represents PN code delayed for a certain time and output via the sound output device 200. For example, the PN code of the first sound 410 and the PN code of the second sound 420 may be the same, e.g., [010110010001111].

In this example, the processor 130 may control the electronic device 100 to output the first sound 410 by modulating the PN code of the first sound 410 into a first carrier frequency, and control the sound output device 200 to output the second sound 420 by modulating the PN code of the second sound 420 into a second carrier frequency. The output first sound 410 and the output second sound 420 may be recorded together via the remote control 300, and the remote control 300 may transmit a resultant recorded signal including the recorded sound to the electronic device 100.

A mixed sound signal illustrated in a right side of FIG. 4 represents a signal 430 obtained by demodulating the recorded signal. The signal 430 may include both the PN code of the first sound 410 and the PN code of the second sound 420. A demodulation method which may be used in the above-described embodiment will be described in greater detail below with reference to FIGS. 5A and 5B.

Figure 5A:
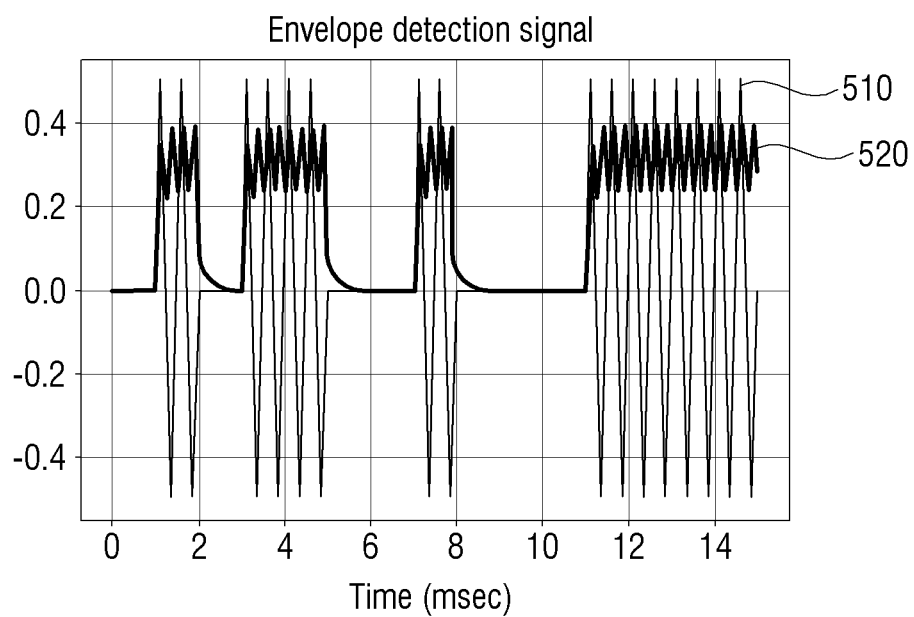
FIGS. 5A and 5B are diagrams illustrating an example demodulation method, according to an embodiment of the disclosure.
Figure 5B:
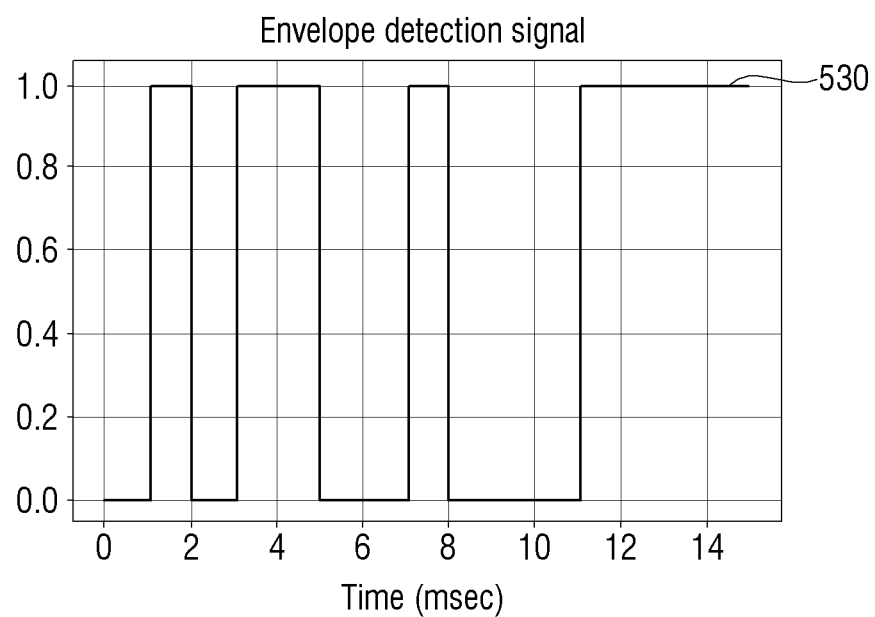

FIGS. 5A and 5B are diagrams illustrating an example demodulation method, according to an embodiment of the disclosure.

In an example embodiment of the disclosure, the processor 130 may identify an output delay time by analyzing a correlation between a PN code and a signal obtained by demodulating a recorded signal received from the remote control 300. In this example, the processor 130 may demodulate the recorded signal by an envelope detection method. FIG. 5A illustrates an example of a process of performing envelope detection. FIG. 5B illustrates an example of a signal on which envelope detection is performed. The term "envelope detection" may refer, for example, to a demodulation method of detecting an envelope (a line connecting maximum amplitudes) of a received signal.

Referring to FIG. 5A, a rectified signal 520 may be obtained by performing envelope detection on a PN code signal 510 modulated into a carrier frequency. The rectified signal 520 may be approximated to a PN code signal as indicated by a graph 530 of FIG. 5B.

In another embodiment of the disclosure, an output delay time may be identified by analyzing a correlation between PN code and a signal obtained by rectifying a signal demodulated by synchronous detection which is different from envelope detection. A method of identifying the output delay time will be described in greater detail below with reference to FIGS. 6A and 6B.

Figure 6A:
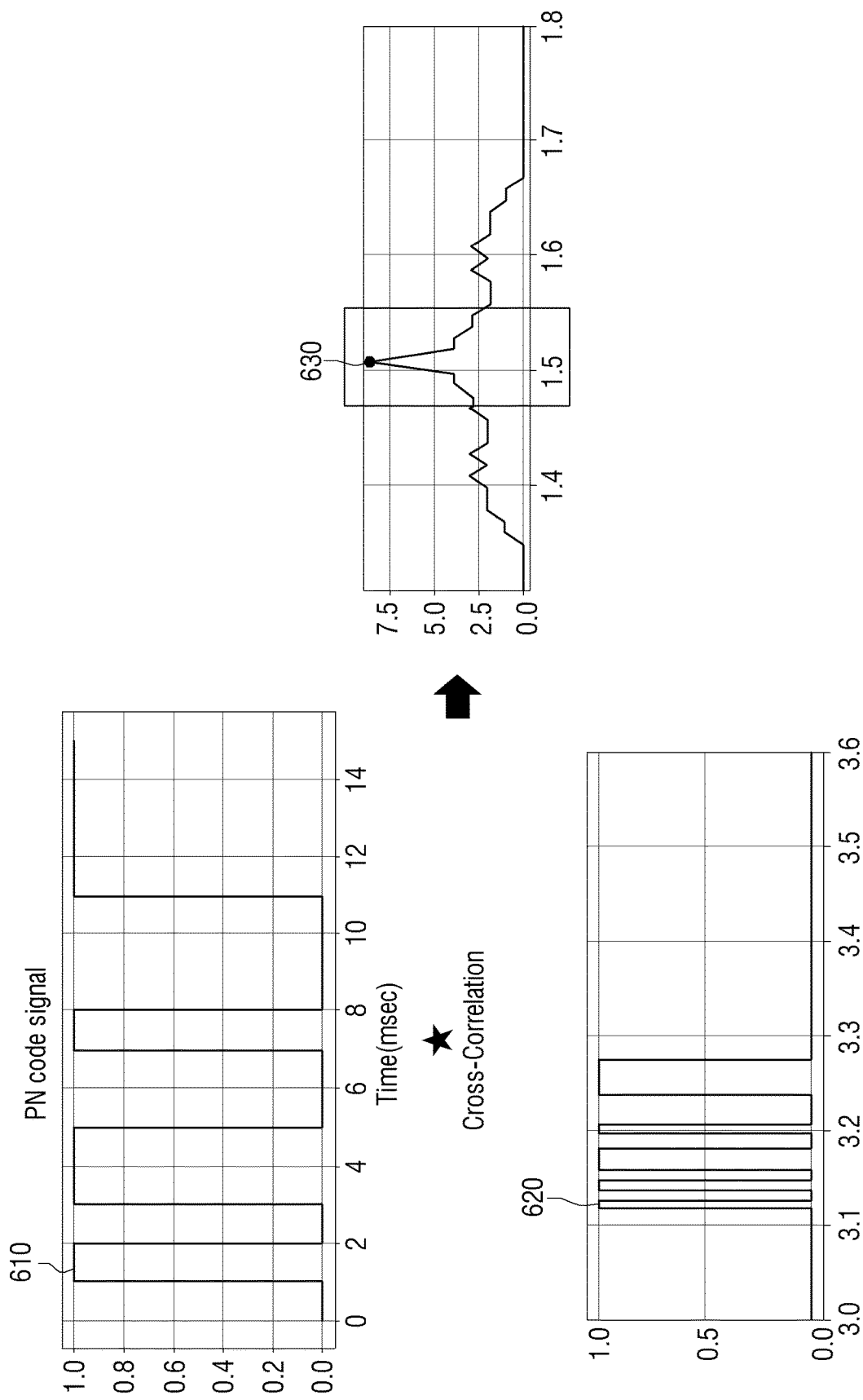
FIGS. 6A and 6B are diagrams illustrating example methods of identifying an output delay time, according to embodiments of the disclosure.
Figure 6B:
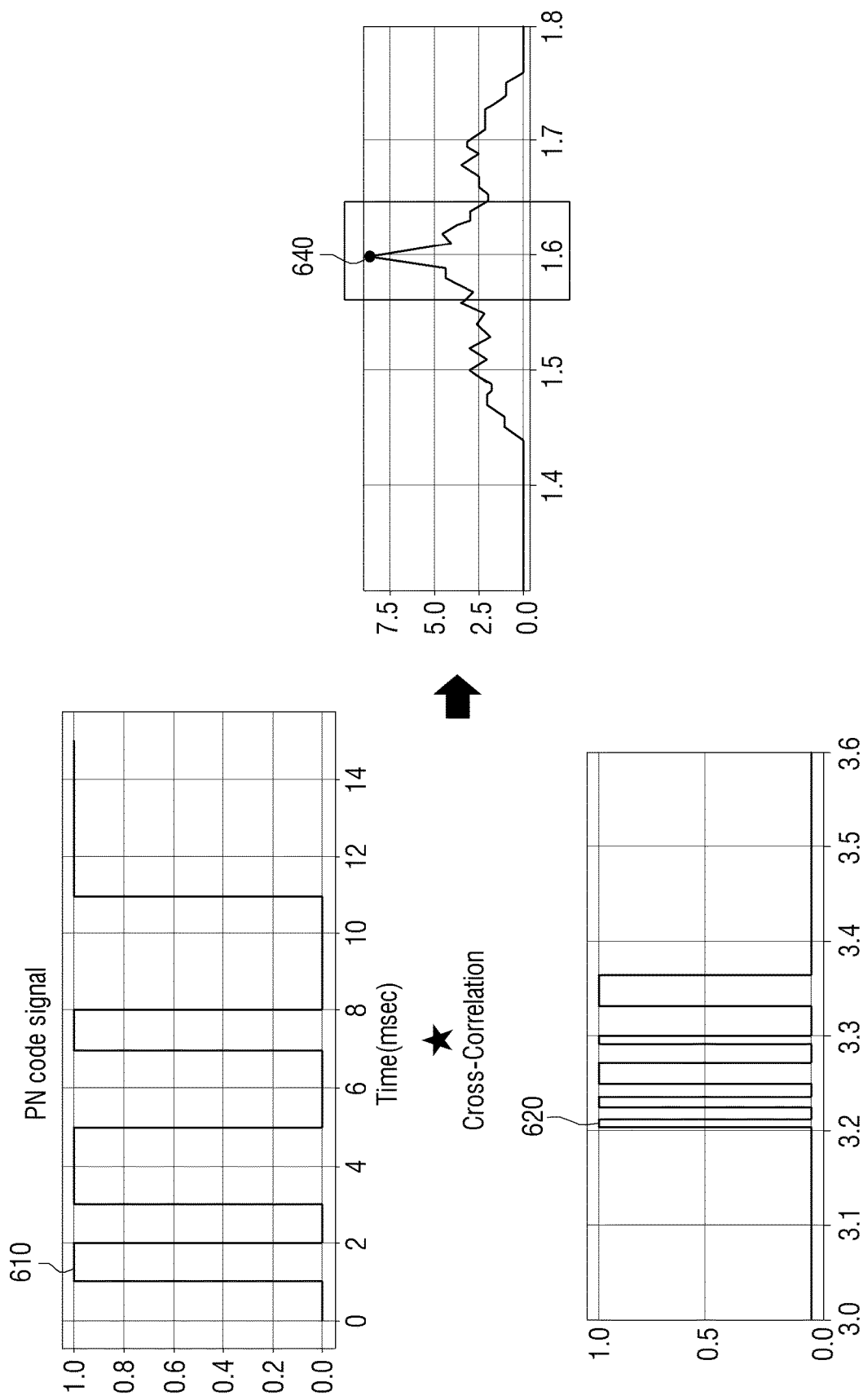

FIGS. 6A and 6B are diagrams illustrating example methods of identifying an output delay time, according to embodiments of the disclosure.

In an example embodiment of the disclosure, the processor 130 may analyze a correlation between PN code 610 and a signal 620 obtained by demodulating a recorded signal received via the remote control 300 to identify, as an output delay time, the difference between a point of time at which a first peak signal 630 is generated and a point of time at which a second peak signal 640 (see, e.g., FIG. 6B) is generated.

In an example embodiment, the analyzing of the correlation analysis by the processor 130 may be performed through a cross-correlation operation. The cross-correlation operation is performed to measure a similarity between two signals, and may be expressed by the following equation:

$$(F\star g)(t)=\int_{-\infty}^{\infty}f^*(\tau)g(\tau+t)d\tau$$

For example, f may represent the signal 620, and g may represent the PN code 610. When the cross-correlation operation is performed to obtain a result according to time t, a maximum value may be obtained at a first time, based on a first correlation related to a first carrier frequency as illustrated in FIG. 6A, and obtained at a second time, based on a second correlation related to a second carrier frequency as illustrated in FIG. 6B.

For example, when integration is performed according to the time t, a maximum value is obtained at a point of time at which a first signal component included in the signal f and the PN code g match each other (a point of time at which a first peak signal is generated), the point of time being identified through the cross-correlation operation.

Similarly, when integration is performed according to the time t, a maximum value is obtained at a point of time at which a second signal component included in the signal f and the PN code g match each other (a point of time at which a second peak signal is generated), the point of time being identified through the cross-correlation operation. Thereafter, the processor 130 may identify, as the output delay time, the difference between the point of time at which the first peak signal 630 is generated and the point of time at which the second peak signal 640 is generated.

FIG. 7 is a flowchart illustrating an example process of identifying an output delay time at which a PN code of test sound is modulated into a carrier frequency, according to an embodiment of the disclosure.

In an example embodiment of the disclosure, the processor 130 may perform envelope detection to demodulate a recorded signal obtained via the remote control 300 (S710). Thereafter, the processor 130 may perform the cross-correlation operation on the PN code and a signal obtained by performing envelope detection (S720). In this example, a first peak signal obtained based on a first correlation and a second peak signal obtained based on a second correlation may be identified (S730), and a time interval between these two peak signals may be identified as an output delay time (S740).

As described above, an output delay time may be identified by modulating a PN code of test sound into a predetermined carrier frequency. A method of identifying an output delay time at which a test sound has different frequencies will be described in greater detail below.

Figure 8:
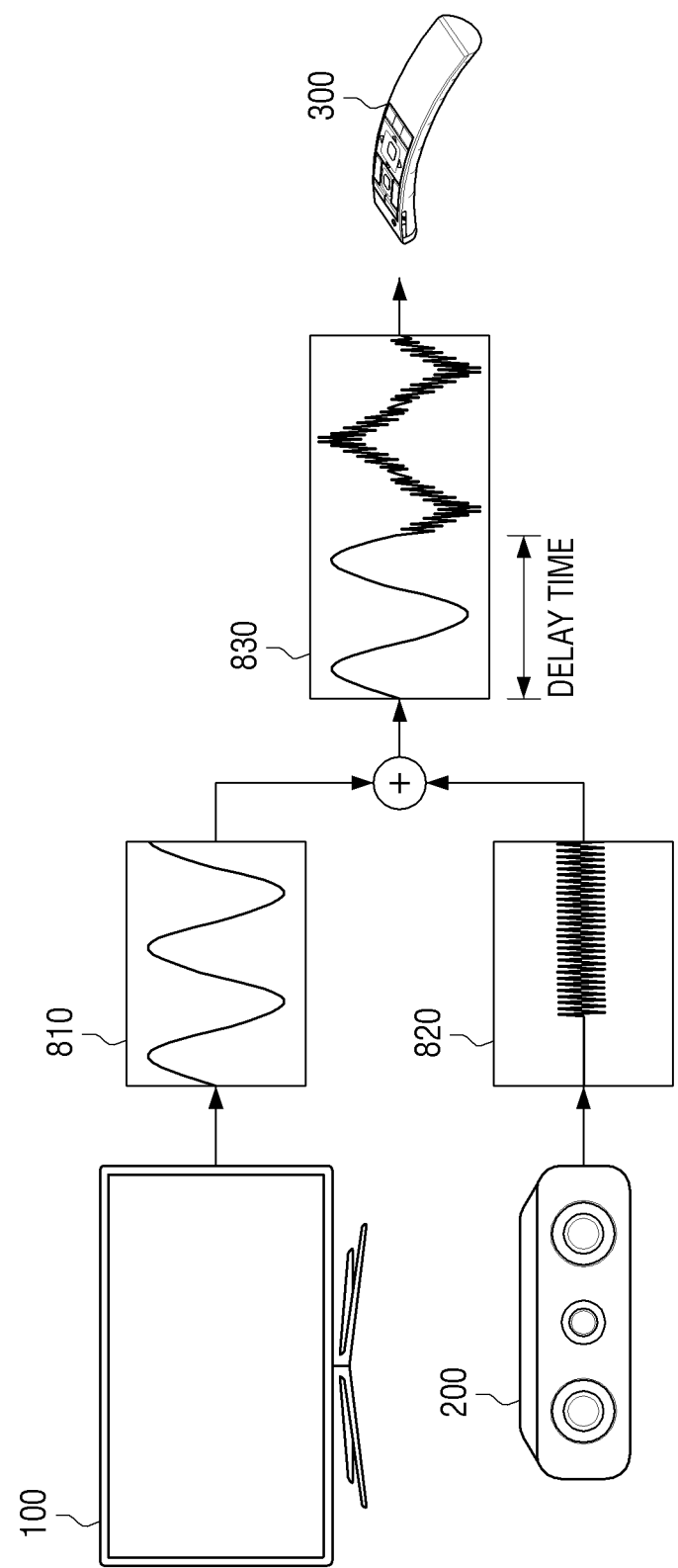
FIG. 8 is a diagram illustrating an example delay in an output of a sound output device, according to an embodiment of the disclosure.

FIG. 8 is a diagram illustrating an example delay in an output of a sound output device, according to the embodiment of the disclosure.

Referring to an example illustrated in FIG. 8, a first or second recorded signal recorded by the remote control 300 may be sound 830 which may be a combination of sound 810 output from an electronic device 100 and sound 820 output from the sound output device 200. In this example, the sound 810 output from the electronic device 100 and the sound 820 output from the sound output device 200 may have different frequencies.

When the second recorded signal recorded by the remote control 300 is transmitted to the electronic device 100, the processor 130 may identify an output delay time of the sound output device 200 according to various embodiments. The example illustrated in FIG. 8 is merely an example of a process of operating the electronic device 100, the sound output device 200, and the remote control 300 and thus embodiments are not limited thereto.

Figure 9A:
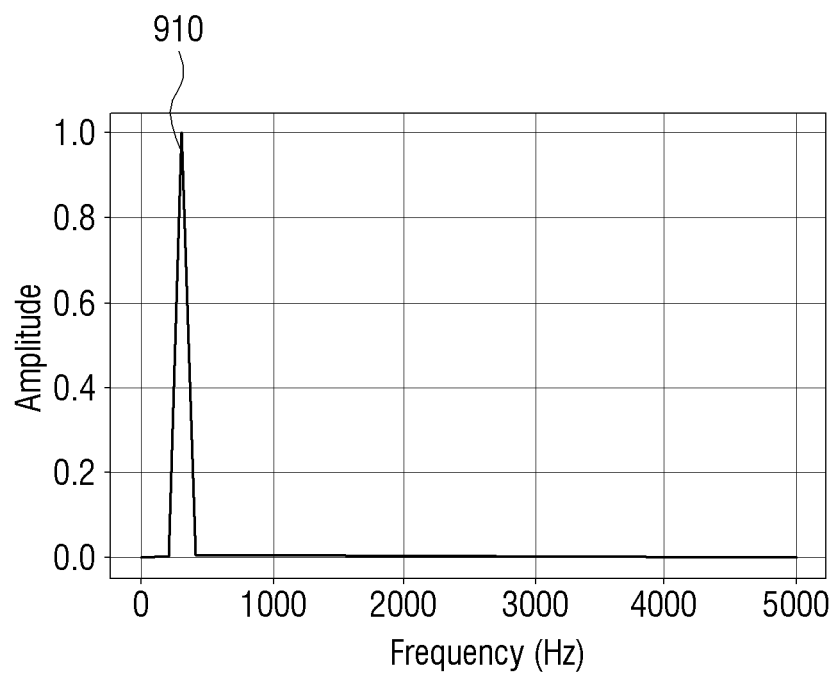
FIGS. 9A and 9B are diagrams illustrating an example in which test sound has different frequencies according to an embodiment of the disclosure.
Figure 9B:
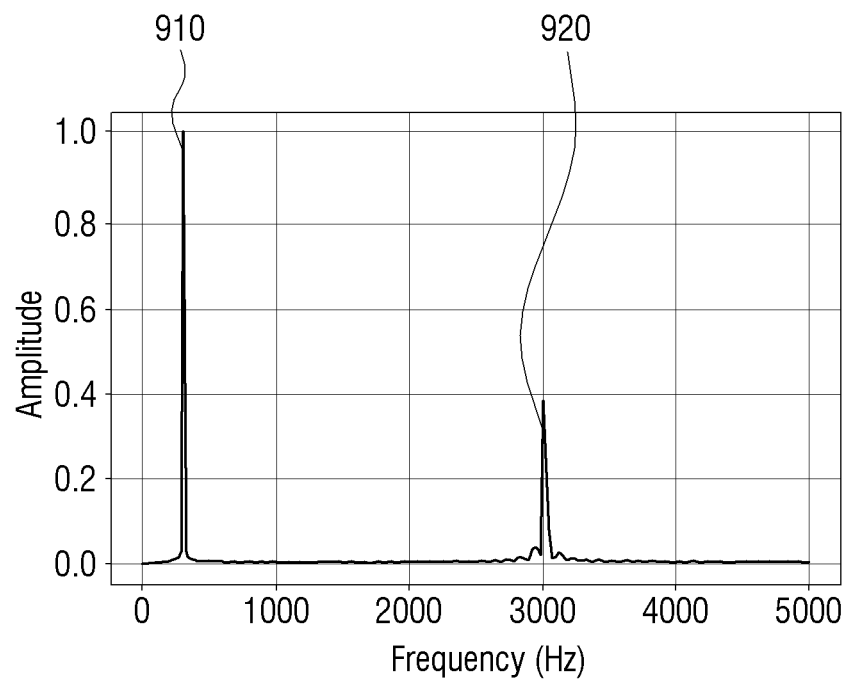

FIGS. 9A and 9B are diagrams illustrating an example in which test sound has different frequencies, according to the embodiment of the disclosure.

In an example embodiment of the disclosure, the processor 130 may control the speaker 120 to output sound 910 of a first frequency, and transmit a control signal to the sound output device 200 to output sound 920 of a second frequency different from the first frequency.

Test sound output from the electronic device 100 and test sound output from the sound output device 200 have different frequencies, and the intensities thereof may be different, but are not limited to frequencies or the amplitudes illustrated in FIGS. 9A and 9B.

The processor 130 may receive from the remote control 300 a second recorded signal obtained by recording the test sound output from the electronic device 100 and the test sound output from the sound output device 200, and identify an output delay time of the sound output device 200, based on the received second recorded signal. For example, the output delay time may be identified based on the difference between a point of time at which the first frequency is identified and a point of time at which the second frequency is identified. A method of identifying the output delay time will be described in greater detail below with reference to FIG. 10.

Figure 10:
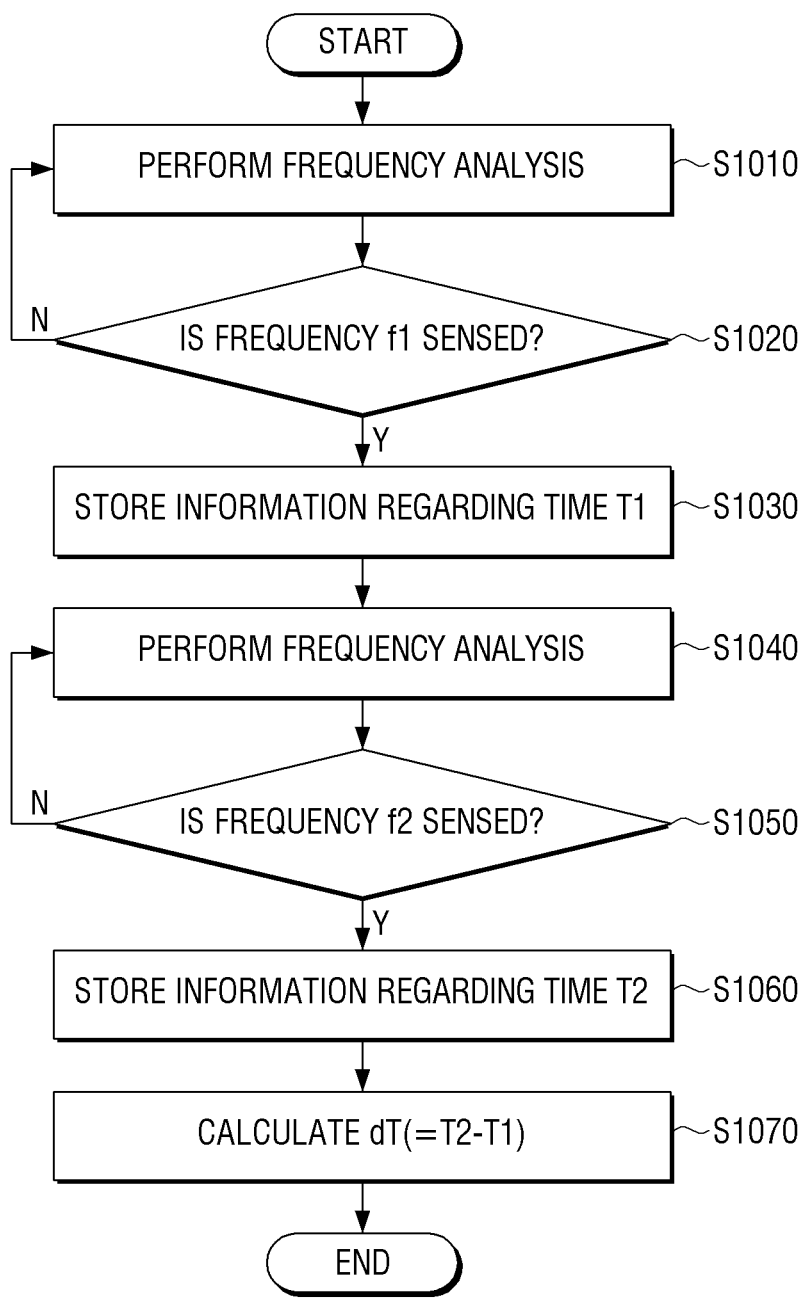
FIG. 10 is a flowchart illustrating an example process of identifying an output delay time, according to an embodiment of the disclosure.

FIG. 10 is a flowchart illustrating an example process of identifying an output delay time, according to an embodiment of the disclosure.

In an example embodiment of the disclosure, the processor 130 may control the electronic device 100 and the sound output device 200 to simultaneously output test sound of different frequencies. The processor 130 performs a frequency analysis on a recorded signal received in real time from the remote control 300 (S1010). In this example, the processor 130 may identify the different frequencies of the sound output from the electronic device 100 and the sound output device 200 through the frequency analysis. The frequency analysis may be performed by a well-known method, such as Fast Fourier Transform (FFT) or the like, but is not limited thereto.

The processor 130 may continue the frequency analysis, when a recorded signal obtained by recording first test sound having a frequency f1 output from the electronic device 100 by the remote control 300 is not transmitted to the electronic device 100 (S1020-N). As another example, the processor 130 may identify the frequency f1, when the recorded signal obtained by recording the first test sound having the frequency f1 output from the electronic device 100 by the remote control 300 is transmitted to the electronic device 100 (S1020-Y). The processor 130 may identify a time T1 when the frequency f1 is identified, and store information regarding the time T1 (S1030).

Because a second frequency f2 is not identified, the processor 130 may continue the frequency analysis (S1040). Similarly, the processor 130 may continue the frequency analysis (S1050-N), when a recording signal obtained by recording the second test sound having the frequency f2 is not received by the electronic device 100, and may identify the frequency f2 (S1050-Y), and may identify a time T2 when the frequency f2 is identified and store information regarding the time T2, when the recording signal obtained by recording the second test sound having the frequency f2 is transmitted to the electronic device 100 (S1060).

In this example, because the difference T2-T1 between the times T1 and T2 is an output delay time between the electronic device 100 and the sound output device 200, the processor 130 may identify the difference T2-T1 as an output delay time (S1070).

As described above, the processor 130 may identify the output delay time between the electronic device 100 and the sound output device 200, and synchronize sound output from the electronic device 100 and sound output from the sound output device 200 with each other as described below.

Figure 11A:
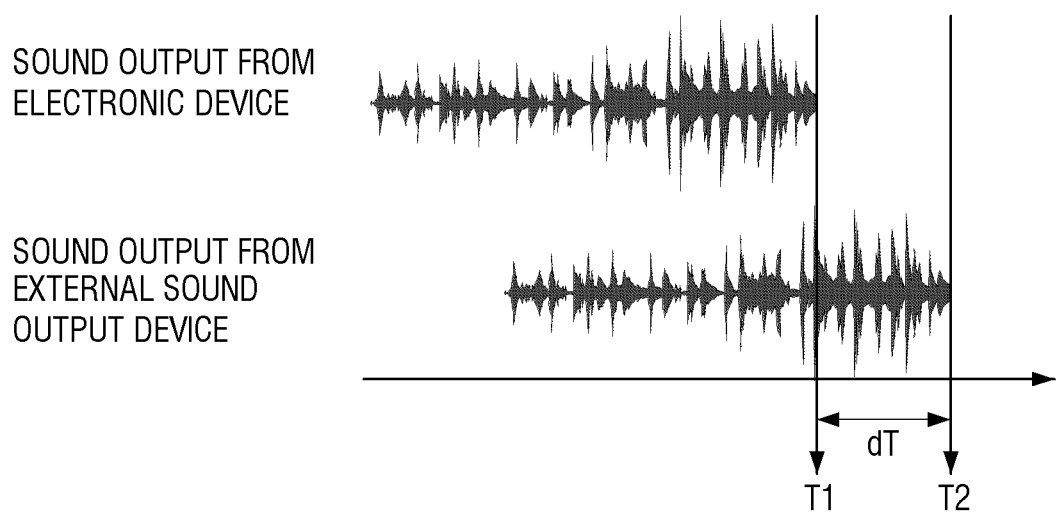
FIGS. 11A and 11B are diagrams illustrating an example process of synchronizing sound of an electronic device with sound of a sound output device, according to an embodiment of the disclosure.
Figure 11B:
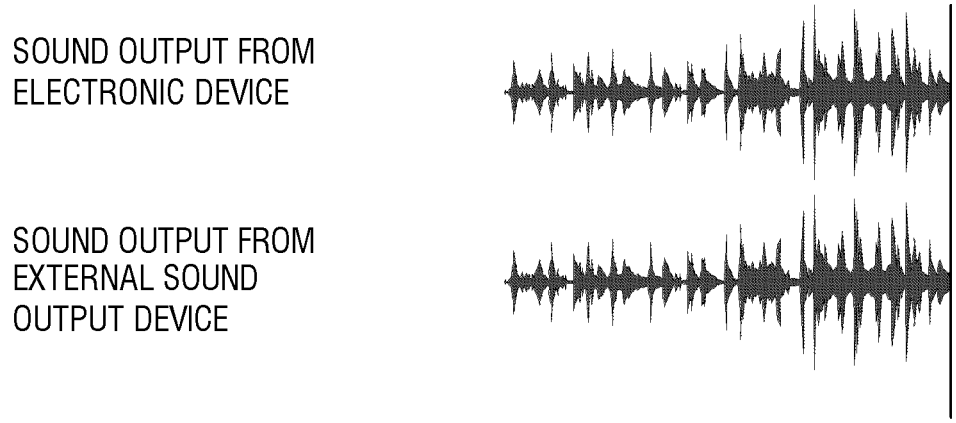

FIGS. 11A and 11B are diagrams illustrating an example process of synchronizing sound of an electronic device with sound of a sound output device, according to an embodiment of the disclosure.

Referring to FIG. 11A, an output delay time may occur in sound output from the sound output device 200 in a state before sound of the electronic device 100 and sound of the sound output device 200 are synchronized with each other. In this example, as illustrated in FIG. 11B, a time at which sound is to be output from at least one of the electronic device 100 or the sound output device 200 may be controlled to equalize a point of time at which sound is to be output from the electronic device 100 and a point of time at which sound is to be output from the sound output device 200 with each other.

For example, the processor 130 may synchronize an output image with sound output from the sound output device 200 by delaying a point of time at which the output image is to be output by the identified output delay time.

Figure 12:
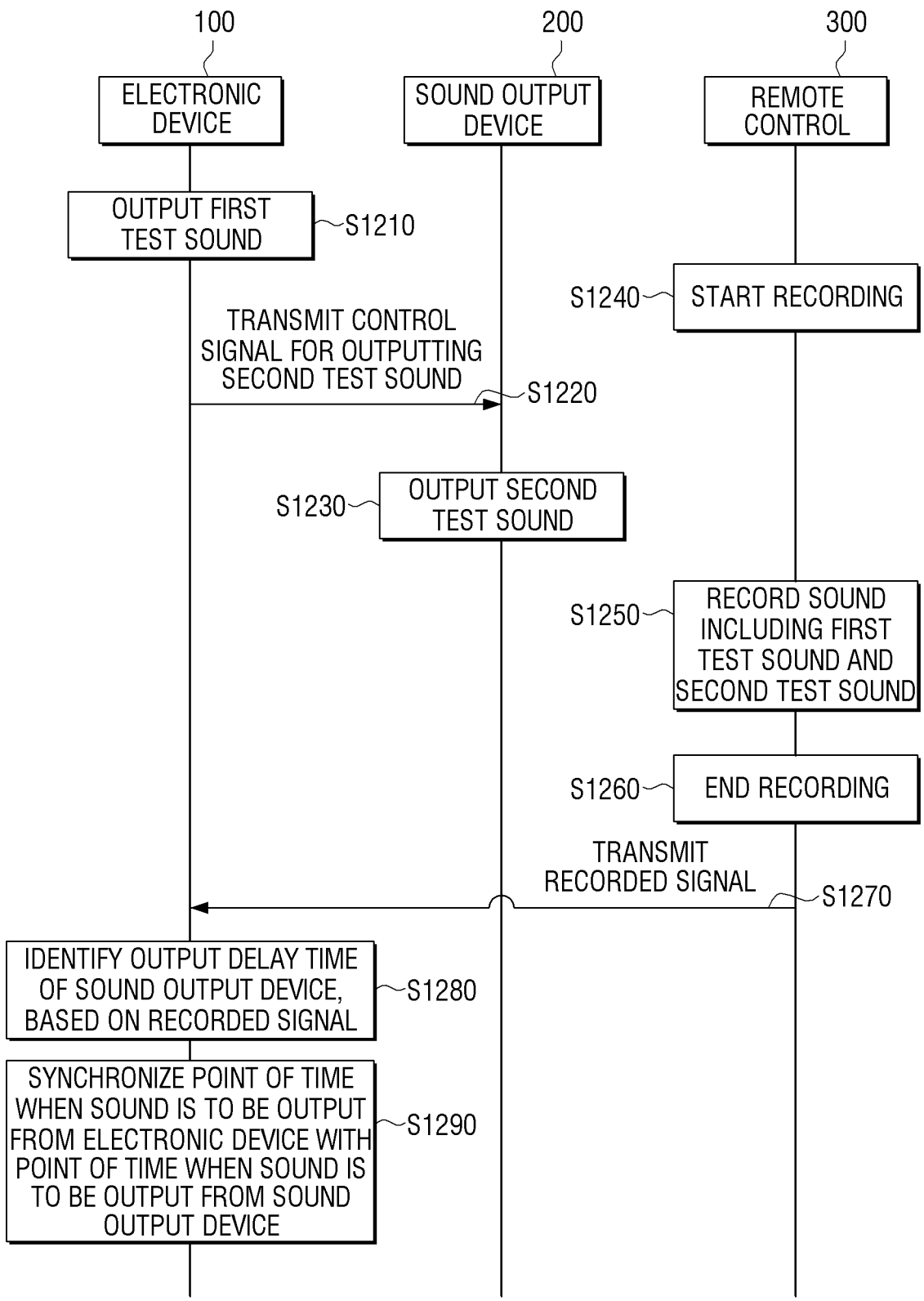
FIG. 12 is a sequence diagram illustrating an example method of synchronizing points of time at which sound is to be output, according to an embodiment of the disclosure.

FIG. 12 is a sequence diagram illustrating an example method of synchronizing points of time at which sound is to be output, according to an embodiment of the disclosure.

The electronic device 100 may output a first test sound (S1210), and at the same time transmit a control signal for outputting second test sound to the sound output device 200 (S1220). The sound output device 200 receives the control signal and outputs the second test sound (S1230).

The remote control 300 starts recording when a predetermined event for starting recording occurs (S1240). For example, the predetermined event may include an event in which a predetermined button of the remote control 300 is pressed, an event in which test sound is first input to a microphone included in the remote control 300, an event in which a command to start recording is received from the electronic device 100, or the like. For example, the command to start recording may include at least one of an event in which the sound output device 200 is connected to the electronic device 100 or an event in which a content provider providing content to the electronic device 100 is changed.

In an example embodiment of the disclosure, the remote control 300 may analyze a recorded signal to identify whether test sound is included in the recorded signal. Because the test sound is periodically repeated for a certain time period, the remote control 300 may start recording at a point of the time at which outputting of the test sound from the electronic device 100 starts but may start recording after the point of time.

When the remote control 300 starts recording, the remote control 300 may record sound including the first test sound output from the electronic device 100 and the second test sound output from the sound output device 200 (S1250).

The remote control 300 ends recording when a predetermined event for ending recording occurs (S1260). For example, the predetermined event may include an event in which a predetermined button of the remote control 300 is pressed, an event in which the same test sound is input a plurality of times to the microphone of the remote control 300, an event in which a predetermined time elapses after recording is started, an event in which a predetermined amount of sound is recorded, or an event in which a command to end recording is received from the electronic device 100.

The remote control 300 transmits the recorded signal including the first test sound and the second test sound to the electronic device 100 (S1270). The electronic device 100 identifies an output delay time of the sound output device 200, based on the recorded signal (S1280). A point of time at which sound is to be output from the electronic device 100 and a point of time at which sound is to be output from the sound output device 200 may be synchronized, based on the identified output delay time (S1290).

Figure 13:
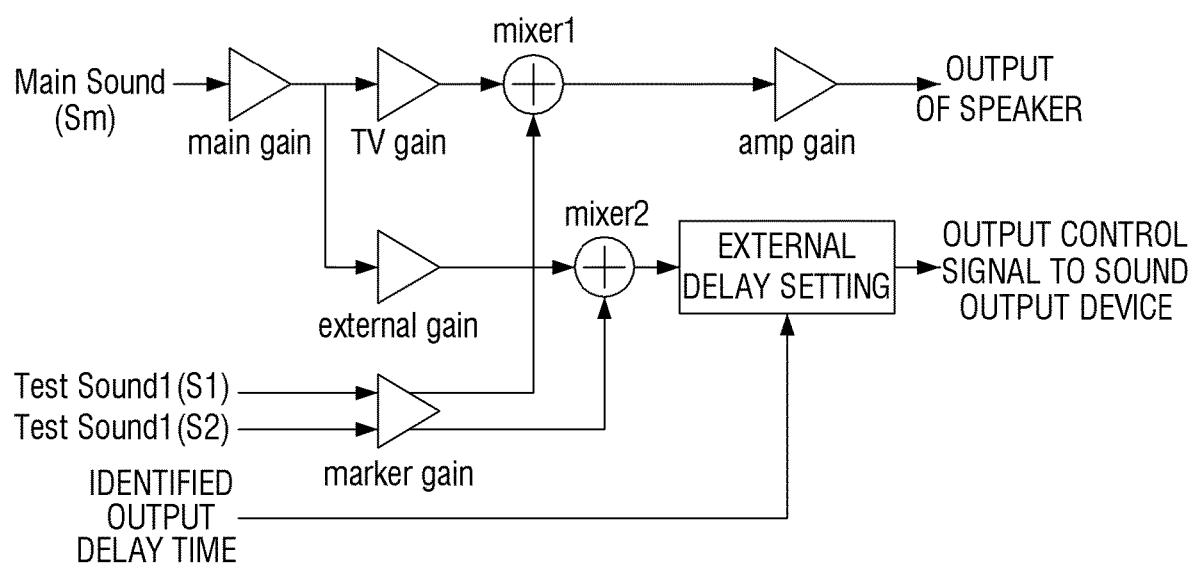
FIG. 13 is a diagram illustrating an example configuration of an audio processor, according to an embodiment of the disclosure.

FIG. 13 is a diagram illustrating an example configuration of an audio processor, according to an embodiment of the disclosure.

Referring to FIG. 13, the audio processor 160 includes various types of audio processing circuitry, such as, for example, and without limitation, gains, a mixer, an external delay setting, or the like.

The gains may be elements configured to adjust the intensities of signals. The gains may include, for example, and without limitation, a main gain, a TV gain, an external gain, a marker gain, an amplifier gain, or the like. Such a gain may be adjusted from 0 to a maximum value. When the gain is 0, no signal is output via an output terminal thereof.

The main gain may be an element for adjusting the intensity of main sound provided from a content provider (e.g., a set-top box or a Blu-ray player).

The TV gain may be an element for adjusting an intensity of sound output from the speaker 120 before test sound of the electronic device 100 is included.

The external gain may be an element for adjusting the intensity of sound output from the sound output device 200 before the test sound is included.

The marker gain may be an element for adjusting the intensity of the test sound. The electronic device 100 may output first sound via the speaker 120, transmit a control signal for outputting second sound to the sound output device 200, receive from the remote control 300 a first recorded signal obtained by recording the first sound signal output via the speaker 120 and the second sound output via the sound output device 200, and obtain information for adjusting output volume of at least one of the speaker 120 or the sound output device 200, based on the first recorded signal.

The marker gain may include a first marker gain and a second marker gain corresponding to the first test sound and the second test sound.

In this example, the processor 130 may adjust at least one of the first marker gain or the second marker gain, based on the obtained information, and adjust output volume of at least one of the first test sound or the second test sound, based on the adjusted at least one of the first or second marker gain. For example, the processor 130 may respectively adjust the output volume of the first test sound and the output volume of the second test sound, based on the adjusted first and second marker gains.

The mixer is configured to mix two pieces of sound to obtain one piece of sound. The mixer may include a first mixer and a second mixer. The first mixer may output only the first test sound or output main sound and the first test sound together according to the TV gain. Final output volume of sound output via the speaker 120 may be determined by the amplifier gain, based on an output signal output by the first mixer.

The second mixer may output only the second test sound or output the main sound and the second test sound together according to the external gain. A delay time for which output sound is to be delayed may be determined by the external delay setting, based on an output signal output by the second mixer.

A point of time at which a control signal is to be transmitted to the sound output device 200 may be controlled by the external delay setting, based on the delay time.

Figure 14:
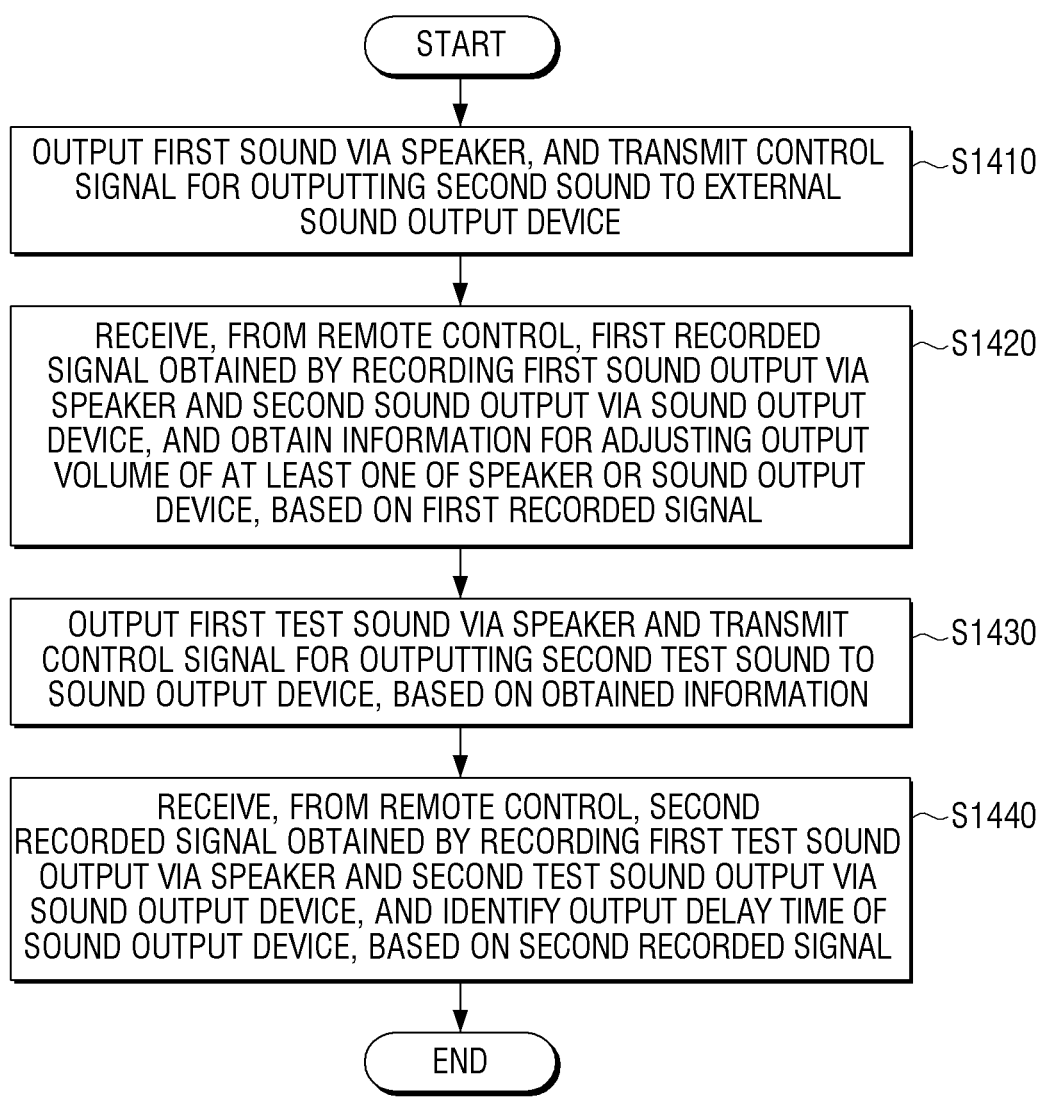
FIG. 14 is a flowchart illustrating an example method of controlling an electronic device, according to an embodiment of the disclosure.

FIG. 14 is a flowchart illustrating an example method of controlling an electronic device according to an embodiment of the disclosure.

The electronic device 100 may output first sound via the speaker 120, and transmit a control signal for outputting second sound to the sound output device 200 (S1410).

The electronic device 100 may receive, from the remote control 300, a first recorded signal obtained by recording the first sound output via the speaker 120 and the second sound output via the sound output device 200, and obtain information for adjusting output volume of at least one of the speaker 120 or the sound output device 200, based on the first recorded signal (S1420).

The electronic device 100 may output a first test sound via the speaker 120 and transmit a control signal for outputting second test sound to the sound output device 200, based on the obtained information (S1430).

The electronic device 100 may receive, from the remote control 300, a second recorded signal obtained by recording the first test sound output via the speaker 120 and the second test sound output via the sound output device 200, and identify an output delay time of the sound output device 200, based on the second recorded signal (S1440).

The operations of the control method have been described in detail above and thus a detailed description thereof will not be repeated here.

It is described above that the electronic device 100 identifies a delay time by receiving sound recorded by the remote control 300, but in some cases, the remote control 300 may identify the delay time, based on the recorded sound.

At least some of the methods according to the various embodiments of the disclosure described above may be embodied in the form of an application installable in at least one of existing electronic devices or remote control devices.

A least some of the methods according to the various embodiments of the disclosure described above may be implemented by upgrading software or hardware for existing electronic devices.

At least some of the various embodiments of the disclosure described above may be implemented by a server embedded in an electronic device or an external server of the electronic device.

At least some of the methods according to the various embodiments of the disclosure described above are installable in existing electronic devices and may be implemented in the form of an application that is software that is directly used in an OS by a user.

A least some of the methods according to the various embodiments of the disclosure described above may be implemented by upgrading software or hardware for existing electronic devices.

Various embodiments of the disclosure may be implemented by a server embedded in an electronic device or an external server of at least one of the electronic device or a display device.

In an example embodiment of the disclosure, the various embodiments described above may be embodied as software including instructions stored in a machine (e.g., a computer)-readable storage medium. The machine is a device capable of invoking the instructions stored in the storage medium and operating according to the invoked instructions, and may include an electronic device (e.g., an electronic device A) according to the embodiments set forth herein. When the instructions are executed by a processor, functions corresponding to the instructions may be performed directly by the processor or under control of the processor. The instructions may include a code made by a compiler or a code executable by an interpreter. The machine-readable storage medium may be provided in the form of a non-transitory storage medium. Here, the "non-transitory" storage medium is tangible but does not indicate whether data is stored in the storage medium semi-permanently or temporarily.

In an example embodiment of the disclosure, the methods according to the various embodiments described above may be provided in a computer program product. A computer program product may be traded as a product between a seller and a purchaser. The computer program product may be distributed in the form of a machine-readable storage medium (e.g., a compact disc read-only memory (CD-ROM)) or distributed online via an application store (e.g., PlayStore™ or AppStore™). At least a portion of the computer program product when distributed online may be at least temporarily stored in a storage medium such as a memory of a server of a manufacturer, a server of an application store, or a relay server, or may be temporarily generated.

In an example embodiment of the disclosure, the various embodiments described above may be implemented in a recording medium readable by a computer or similar device using software, hardware, or a combination thereof. In some cases, the embodiments described herein may be implemented by a processor itself. Embodiments, such as procedures and functions described herein, when embodied as software may be embodied as separate software modules. Each of the software modules may perform one or more of the functions and operations described herein.

Computer instructions to perform processing operations of a machine according to the various embodiments described above may be stored in a non-transitory computer-readable medium. The computer instructions stored in such a non-transitory computer-readable medium, when executed by a processor of a specific machine, cause the machine to perform the operations performed by a device according to the various embodiments described above. The non-transitory computer-readable medium refers to a medium capable of semi-permanently storing data and being readable by a machine. Examples of the non-transitory computer-readable medium include, but are not limited to, a CD, a DVD, a hard disk, a Blu-ray disk, a USB, a memory card, a ROM, etc.

In addition, each component (e.g., a module or a program) according to the above-described various embodiments may include a single entity or a plurality of entities, and some of the sub-components described above may be omitted or other sub-components may be further included in the various embodiments. Alternatively or additionally, some components (e.g., modules or programs) may be integrated into one entity to perform functions, which are performed by the components prior to the integration, in the same or similar manner. Operations performed by a module, a program, or another component according to various embodiments may be performed in a sequential, parallel, iterative, or heuristic manner, at least some of the operations may be executed in a different order or omitted, or other operations may be added.

While various example embodiments of the disclosure have been illustrated and described herein, the disclosure is not limited thereto and various modifications may be made therein by those of ordinary skill in the art without departing from the spirit of the disclosure. These modifications should not be understood separately from the scope and spirit of the disclosure.

What is claimed is:

1. An electronic device comprising:
a communicator comprising communication circuitry;
a speaker; and
a processor configured to control the electronic device to:
output a first sound via the speaker and control the communicator to transmit a control signal to output a second sound to an external sound output device;
receive from an external remote control a first recorded signal obtained by recording the first sound output via the speaker and the second sound output via the external sound output device, and obtain information for adjusting output volume of at least one of the speaker or the external sound output device based on the first recorded signal;
control the speaker to output a first test sound and the communicator to transmit a control signal to output a second test sound to the external sound output device based on the obtained information; and
receive from the external remote control a second recorded signal obtained by recording the first test sound output via the speaker and the second test sound output via the external sound output device, and identify an output delay time of the external sound output device based on the second recorded signal.

2. The electronic device as claimed in claim 1, wherein the processor is configured to control the communicator to transmit the information for adjusting the output volume of the external sound output device to the external sound output device, together with the control signal to output the second test sound.

3. The electronic device as claimed in claim 1, wherein the processor is configured to control the electronic device to identify the first sound, the second sound, and noise sound included in the first recorded signal, and to obtain the information for adjusting the output volume of at least one of the speaker or the external sound output device based on information regarding intensities of the first sound, the second sound, and the noise sound.

4. The electronic device as claimed in claim 1, wherein the first test sound comprises a sound of a first carrier frequency, the first sound including a pseudo random noise (PN) code, and
the second test sound comprises a sound of a second carrier frequency, the second sound including the PN code.

5. The electronic device as claimed in claim 4, wherein the second carrier frequency has a frequency different from a frequency of the first carrier frequency.

6. The electronic device as claimed in claim 4, wherein the processor is configured to control the electronic device to identify a first correlation between the second recorded signal and the sound of the first carrier frequency and a second correlation between the second recorded signal and the sound of the second carrier frequency, and to identify the output delay time based on a difference between a point of time at which a first peak signal is generated based on the first correlation and a point of time at which a second peak signal is generated based on the second correlation.

7. The electronic device as claimed in claim 6, wherein the processor is configured to control the electronic device to identify the first correlation by performing a cross-correlation operation on the second recorded signal and the PN code included in the sound of the first carrier frequency, and to identify the second correlation by performing the cross-correlation operation on the second recorded signal and the PN code included in the sound of the second carrier frequency.

8. The electronic device as claimed in claim 4, wherein each of the sound of the first carrier frequency and the sound of the second carrier frequency comprises sound in which a section including the PN code and a section not including the PN code is periodically repeated.

9. The electronic device as claimed in claim 1, wherein the first test sound comprises sound of a first frequency, the second test sound comprises sound of a second frequency, the second frequency being different from the first frequency, and the processor is configured to control the electronic device to identify the output delay time based on a difference between a point of time at which the first frequency is identified and a point of time at which the second frequency is identified.

10. The electronic device as claimed in claim 1, wherein the first sound does not include the first test sound and the second sound does not include the second test sound.

11. The electronic device as claimed in claim 1, wherein the processor is configured to control the electronic device to synchronize a point of time at which sound is to be output via the speaker and a point of time at which sound is to be output via the external sound output device with each other based on the output delay time.

12. The electronic device as claimed in claim 1, wherein, in a sound synchronization mode, the processor is configured to control the speaker to output the first test sound and to control the communicator to transmit the control signal to output the second test sound to the external sound output device.

13. The electronic device as claimed in claim 12, wherein the processor is configured to enter the sound synchronization mode based on at least one of an event for connecting the external sound output device to the electronic device, an event for changing a content provider providing content to the electronic device, or an event for pressing a predetermined button of the external remote control occurring.

14. A method of controlling an electronic device, comprising:
outputting a first sound via a speaker and transmitting a control signal to output a second sound to an external sound output device;
receiving, from an external remote control, a first recorded signal obtained by recording the first sound output via the speaker and the second sound output via the external sound output device, and obtaining information for adjusting output volume of at least one of the speaker or the external sound output device based on the first recorded signal;
outputting a first test sound via the speaker and transmitting a control signal to output a second test sound to the external sound output device based on the obtained information; and
receiving, from the external remote control, a second recorded signal obtained by recording the first test sound output via the speaker and the second test sound output via the external sound output device, and identifying an output delay time of the external sound output device based on the second recorded signal.

15. The method as claimed in claim 14, wherein the transmitting of the control signal to output the second test sound to the external sound output device comprises transmitting the information for adjusting the output volume of the external sound output device to the external sound output device, together with the control signal to output the second test sound.

16. The method as claimed in claim 14, wherein the obtaining of the information comprises:
identifying the first sound, the second sound, and a noise sound included in the first recorded signal; and
obtaining the information for adjusting the output volume of at least one of the speaker or the external sound output device based on information regarding intensities of the first sound, the second sound, and the noise sound.

17. The method as claimed in claim 14, wherein the first test sound comprises sound of a first carrier frequency, the first sound including a pseudo random noise (PN) code, and
the second test sound comprises sound of a second carrier frequency, the second sound including the PN code.

18. The method as claimed in claim 17, wherein the second carrier frequency has a frequency different from a frequency of the first carrier frequency.

19. The method as claimed in claim 17, wherein the identifying of the output delay time comprises:
identifying a first correlation between the second recorded signal and the sound of the first carrier frequency and a second correlation between the second recorded signal and the sound of the second carrier frequency; and
identifying the output delay time based on a difference between a point of time at which a first peak signal is generated based on the first correlation and a point of time at which a second peak signal is generated based on the second correlation.

20. The method as claimed in claim 19, wherein the identifying of the output delay time comprises:
identifying the first correlation by performing a cross-correlation operation on the second recorded signal and the PN code included in the sound of the first carrier frequency; and
identifying the second correlation by performing the cross-correlation operation on the second recorded signal and the PN code included in the sound of the second carrier frequency.

* * * * *